US005453928A

United States Patent [19]

Kaminkow et al.

[11] Patent Number: 5,453,928

[45] Date of Patent: Sep. 26, 1995

[54] PERCENTAGING SYSTEM FOR AMUSEMENT GAME

[75] Inventors: Joseph E. Kaminkow, Buffalo Grove; Kevin J. Martin, Elk Grove Village, both of Ill.

[73] Assignee: Sega Pingall, Inc., Melrose Park, Ill.

[21] Appl. No.: 225,310

[22] Filed: Apr. 8, 1994

[51] Int. Cl.[6] .............................. G06F 161/00

[52] U.S. Cl. .............................. 364/411

[58] Field of Search .............................. 364/411, 410; 273/434, 438, 437

[56] References Cited

U.S. PATENT DOCUMENTS

| | | | |
|---|---|---|---|
| 4,198,051 | 4/1980 | Bracha et al. | 273/121 A |
| 4,685,677 | 8/1987 | DeMar et al. . | |
| 5,257,179 | 10/1993 | DeMar . | |

FOREIGN PATENT DOCUMENTS

| | | |
|---|---|---|
| 142371A3 | 5/1985 | European Pat. Off. . |
| 1591001 | 6/1981 | United Kingdom . |
| 2171234 | 8/1986 | United Kingdom . |

OTHER PUBLICATIONS

Seninsky, "The Care and Feeding of Your Pinball Machine", published by Bally Midway at page 14.

Seninsky, "The Care and Feeding of your Pinball Machine", *PLAY METER*, (Aug. 1, 1984).

"Coinman of the Month–Michael Stroll", *PLAY METER*, Feb. 1979 at page 18.

Powers, "A Pin Game's Life", *PLAY METER*, (Nov. 1976), pp. 33–34.

Pierson, "Pinball by Nabisco", *PLAY METER* (Jan, 1977).

*PLAY METER*, (Jun. 15, 1980) "Circus" by D. Gottlieb & Co.

*PLAY METER*, (Nov. 15, 1980) "Skateball" by Bally, p. 52.

*PLAY METER*, "Coinman Interview–Todd Erickson", (Jun. 15, 1985).

*Grayhound Electronics, Inc.*, "The Super Poker Instructions", (1986).

*PLAY METER* (Jan. 1986) and *PLAY METER* (Jan. 15, 1986) "High Speed" by Williams Electronics, Inc.

Storbeck, "Bookkeeping Features Key Game Adjustment" *PLAY METER* (Aug. 15, 9186).

"The Laser War" Instruction Manual (1987) (excerpt).

"Torpedo Alley" Instruction Manual (1988) (excerpt).

"Jurassic Park" Instruction Manual (1993) (excerpt).

*Primary Examiner*—Donald E. McElheny, Jr.

*Attorney, Agent, or Firm*—Gerstman, Ellis & McMillin, Ltd.

[57] ABSTRACT

A percentaging system for an amusement game is provided which comprises entering into memory a desired percentage of game awards and the data representing scores achieved by players for a predetermined number of games. The desired percentage is multiplied by the number of scores in memory and a new score to beat is determined from the stored score data based upon the product of these two numbers. The new replay level is then entered into memory.

7 Claims, 5 Drawing Sheets

PERCENTAGING SYSTEM FOR AMUSEMENT GAME

FIELD OF THE INVENTION

The present invention concerns a novel percentaging system for an amusement game.

BACKGROUND OF THE INVENTION

Percentaging systems for amusement games are known. Percentaging systems operate in an attempt to maintain a certain desired percentage of free games, replays or other reward awarded in an effort to maintain player interest and/or profitability. This is done by changing the replay value or modifying some game rule or feature. It is thought that, if a game is too easy and too many free games are won, players will lose interest and the game will be unprofitable. On the other hand, if a game is too hard and few or no free games are won, players will become discouraged and no longer play and the game will be unprofitable.

We have developed a system which tracks the number of rewards, typically free games, and makes adjustments to an amusement game in order to maintain player interest.

An object of the present invention is to provide a percentaging system for an amusement game that is easy to construct and is simple in operation.

Another object of the present invention is to provide a percentaging system for an amusement game that is economical in construction.

Other objects and advantages of the present invention will become apparent as the description proceeds.

SUMMARY OF THE INVENTION

In accordance with the present invention, a percentaging system for an amusement game is provided which comprises entering into memory a desired percentage of replays and data representing the scores achieved by players. The data representing the scores achieved by players is maintained in memory for a predetermined number of games. An index number is calculated by multiplying the desired percentage of replays by the number of scores maintained in memory. A new replay value is determined by combining said index number and the data representing the scores achieved by players. The new replay value is then entered into memory. In an illustrative embodiment, the combining step includes the steps of sorting the scores achieved by players from highest to lowest, choosing from the sorted scores the two scores whose places in the sorted list of scores most nearly correspond to the index number and averaging said two scores.

In an illustrative embodiment, the amusement game is a coin-operated amusement game such as a pinball machine.

In an illustrative embodiment, the percentage system is damped for a set number of games such that no adjustments or lesser adjustments to the replay value are made.

In an illustrative embodiment, the score to beat is temporarily boosted if a player's score exceeds the score to beat. The temporary boost will be determined by the amount by which the player's score exceeds the score to beat and can be further based upon the number of consecutive free games won.

In an illustrative embodiment, the score to beat may be adjusted based upon the history of the making of a playfield feature.

A more detailed explanation of the invention is provided in the following description and claims, and is illustrated in the accompanying drawings.

DETAILED DESCRIPTION OF THE ILLUSTRATIVE EMBODIMENT

Figure 1:
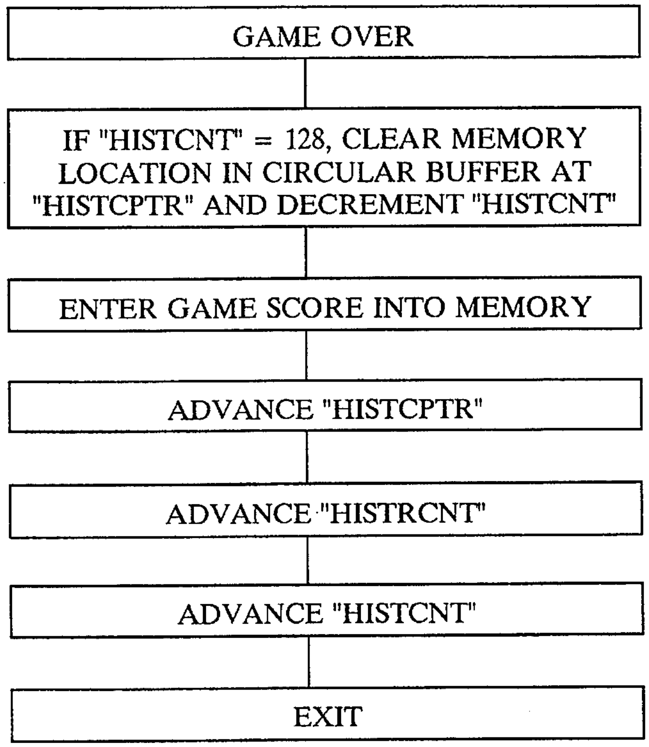
FIGS. 1, 2, 3A–3C are flow diagrams useful in explaining various aspects of the operation of the present invention.

The description of the illustrative embodiments provided herein will be directed towards the use of the invention in a coin-operated pinball game incorporating a microprocessor. It should be understood that the present invention may be readily adapted to other coin-operated devices such as video games or novelty games and to other devices such as computer games and to mechanical or electro-mechanical devices.

It should also be understood that it is typical in microprocessor-controlled pinball games to give the operator the option to disable the percentaging system and to a lesser extent, to customize the operation thereof. It is also typical, however, to have pinball machines and their percentaging systems preset at the factory to operate in a "standard" manner. Therefore, although to some extent the operator adjustable options which might be made available will be described herein, it should be understood that it is one advantage of the present system that it may be readily adapted or customized to operate in accordance with the operator's desires.

The percentaging system can be made to operate automatically such that adjustments to the replay value are made automatically after a set number of games, a set time period, or after some condition is met, such as the coin door is opened or the game is powered on. Alternatively, in a presently preferred embodiment, the system operates such that when the coin door is opened, a prompt is shown on the video display and the game produces sounds. If a button (such as the start button, a flipper button, an audit or adjusted button, etc.) is pushed an adjustment to the replay level is made. Of course, some other action may be prompted. If the appropriate action is not taken, no adjustment to the replay value is made.

The prompt may be persistent or non-persistent. By persistent, it is meant that, if the appropriate action is not taken, the prompt will appear the next time the coin door is opened. By non-persistent it is meant that, if the appropriate action is not taken, the prompt will not appear again when the coin door is opened unless the number of games or time period required between adjustments has passed.

Pinball machines typically allow for up to four replay levels. Each of the replay levels is set to a higher point value than the next lower level. For example, if the first replay level is set at 100,000,000 points; the second replay level may be set to 200,000,000 points; the third replay level may be set to 300,000,000 points and the fourth replay level may be set to 400,000,000 points. The operator has the option of adjusting the number of replay levels and the replay level values for each level. Normally, a free game, free ball or some other game reward is obtained by exceeding the number of points associated with a replay level.

The percentaging system operates to raise or lower the first replay level (herein referred to as the "replay value"). The term "score to beat" as used herein refers to the score needed by the player to obtain the reward normally associated with the first replay level. It normally would be equal to the replay value but may be different due to such game enhancements as replay boosting which is described below. If higher replay levels are activated, the system may adjust all the point values by the same percentage or by the same value as the adjustment to the replay value or score to beat.

In its presently preferred embodiment, the percentaging system will operate as follows to make adjustments to the replay value on a coin-operated, microprocessor-controlled pinball machine. The desired replay percentage is preset at the factory or is set by the operator. A typically preset and/or recommended desired replay percentage is 10%, that is, on average 1 out of 10 games exceeds or equals a replay value and earns a free game.

As games are completed, data representing the scores achieved by players are entered into memory. Actual scores may be recorded or data indicating the score was within a certain range may be recorded.

The most recent 128 game scores are stored in memory accurate to the nearest million (1–9999 million in two binary coded decimal bytes) in a 256 byte circular buffer. Of course, the number of scores which are stored could be more or less. Three variables are also maintained: "histcptr" is a pointer into the circular buffer just past the most recently earned score; "histrcnt" is a count of how many scores have been recorded since the last time the percentaging routine was run and "histcnt" is a count of how many valid scores are recorded in the circular buffer. As games are completed, scores are entered into the circular buffer and all three variables are advanced. See FIG. 1.

Figure 2:
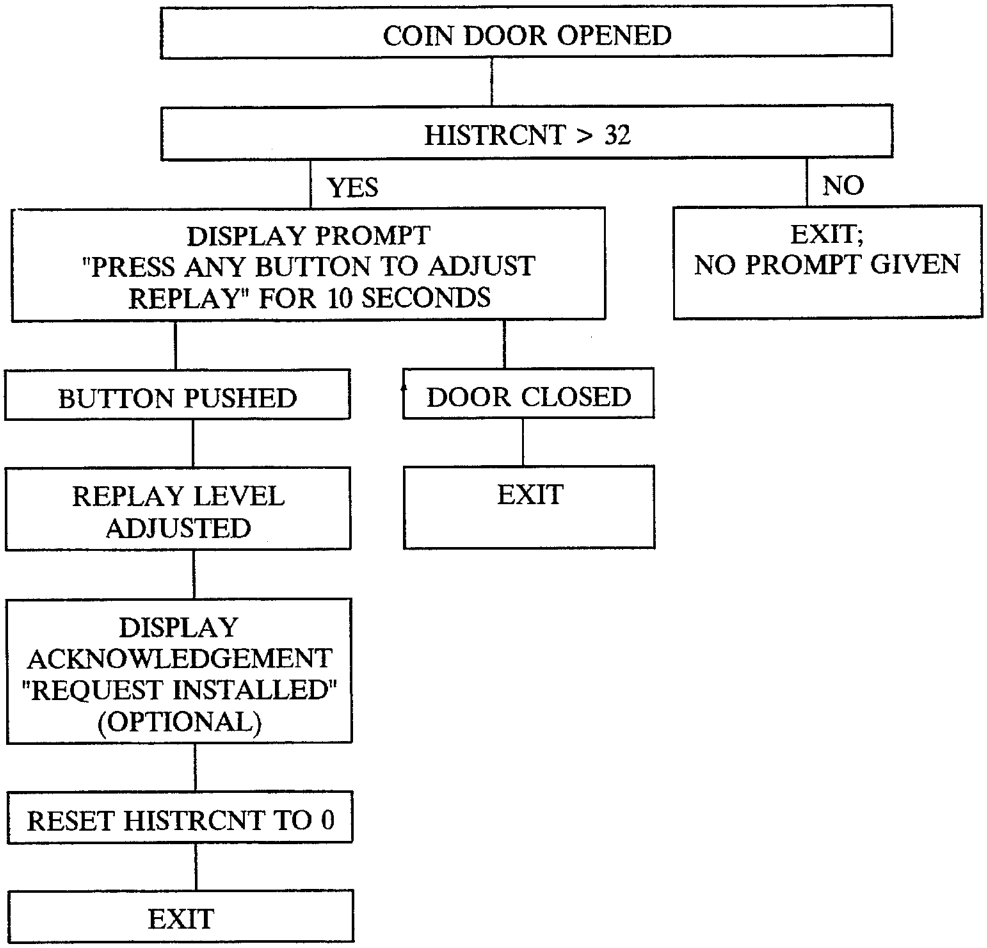

As shown in FIG. 2, when the coin door is opened, a determination is made to see if "histrcnt" exceeds a set minimum number of games, in this example, 32. If so, a prompt, such as "Press Any Button to Adjust Replay" is shown on the video display for about 10 seconds. If a button on the machine is pushed during the display of the message or any time before the door is closed, the replay value will be adjusted. As an optional element of this system, a visual acknowledgement "Request Installed" may then be shown on the video display in order to confirm to the operator that the requested adjustment has been made. Then, the "histcnt" is reset to zero.

Figure 3A:
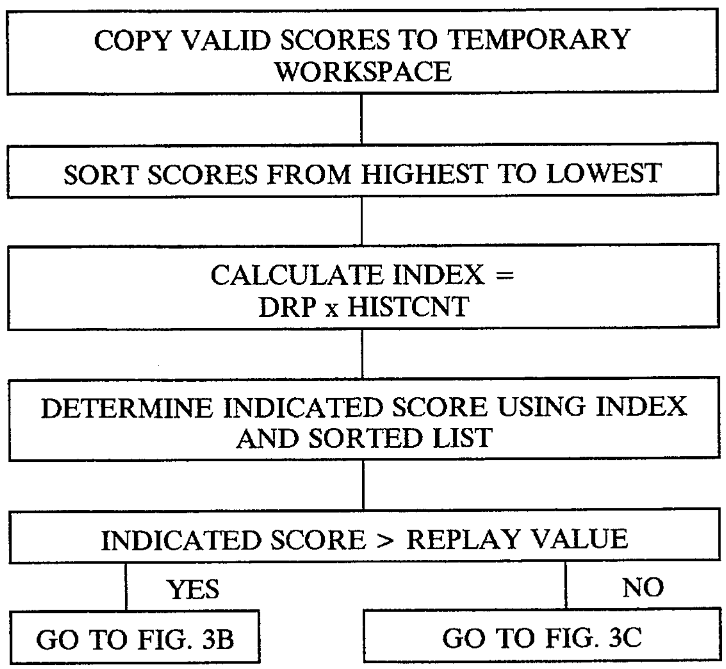
Figure 3B:
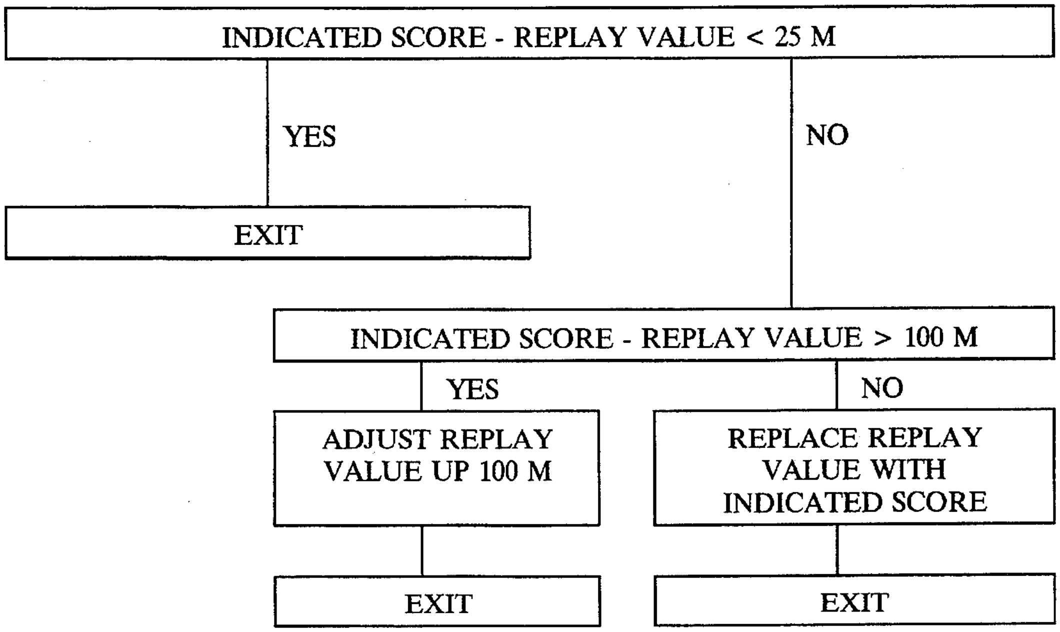
Figure 3C:
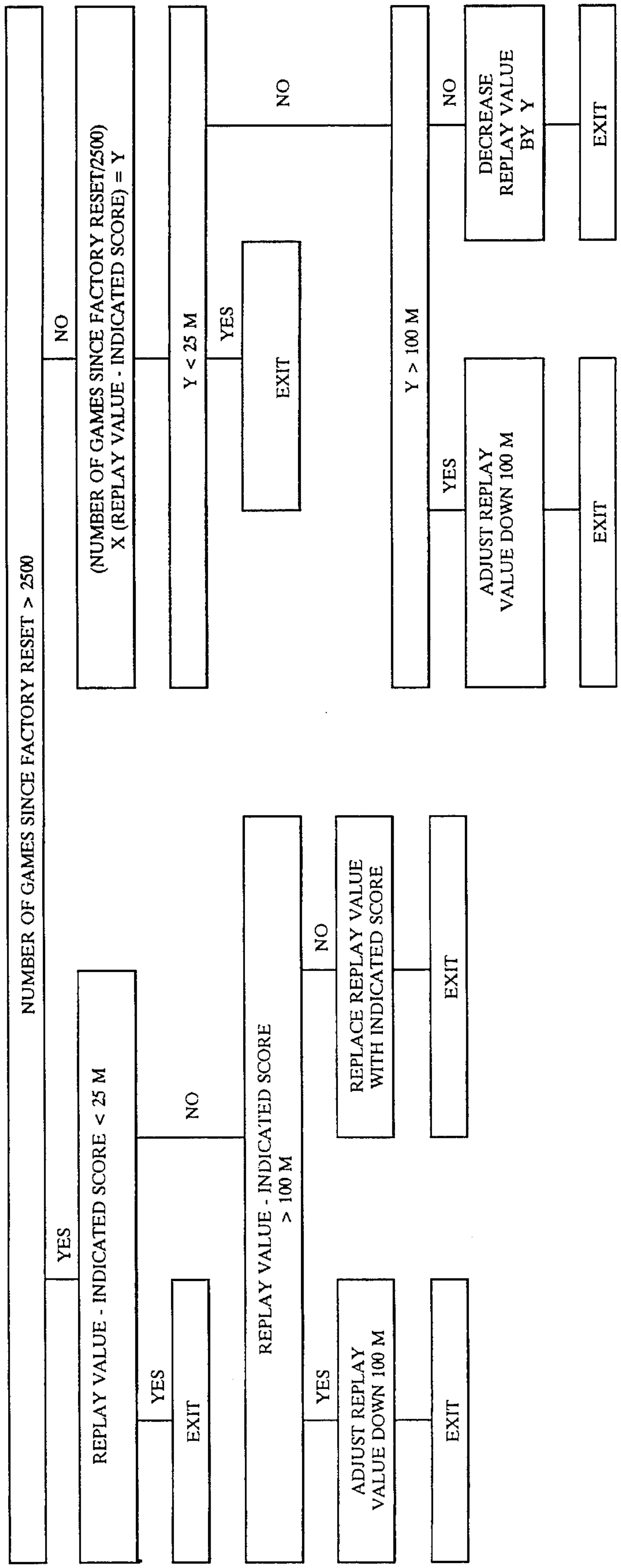

As shown in FIGS. 3A–3C, to determine the new indicated replay level value ("Indicated Score"), all of the valid scores (counted by "histcnt") in the circular buffer are copied to a temporary workspace and sorted from highest to lowest. Next, an index number is determined by multiplying the desired replay percentage ("DRP") by the number of valid scores in the buffer Chistcnt"). For example, if the desired replay percentage was 7% and there were 128 valid scores, the index number would be 8.96 (0.07×128=8.96). The indicated score is then determined from the two scores adjacent this index number in the sorted list. In this example, the average of the 8th and 9th scores would become the indicated score.

There are restrictions placed on the replay value adjustment and the indicated score will not necessarily get installed as the new replay value. In the illustrative embodiment, there are minimum and maximum changes allowed in the replay value. If the difference between the indicated score and the replay value is less than some set amount (in the example, 25 million), the replay value is not adjusted. See FIG. 3B. If the difference between the replay value is greater than same set amount (in the example, 100 million points), the replay value is adjusted by 100 million points. See FIG. 3A.

A still further restriction which can be placed on the replay adjustment is that the change in the replay value can be prevented or damped when the game is new (or has been factory reset). See FIG. 3C. In the illustrative embodiments shown in FIG. 3C, this damping occurs only during a set number of games (in the example, 2500 games) and only when the replay value adjustment would be downward. The purpose of this damping is to keep the replay value from going down too quickly while a game is new. It is believed that normal replay adjustment is unnecessary or even detrimental on a new machine because when a game is new and novel it tends to earn well regardless of the replay percentage. After the newness or fresh appeal of the machine has worn off, normal replay adjustment will keep the replay value at the desired replay percentage where it is hoped it will encourage and challenge players.

The damping of the replay score adjustment is determined by the number of games played on the machine. It could be a series of set percentages or a constantly varying percentage of the difference between the old replay value and the indicated score. For example, during the first 300 games, the maximum shift allowed could be 10% of the difference. And between 300–1500 games, the maximum shift allowed could be 50%. Between 1500–2500 games, the maximum shift allowed could be 75%.

Alternatively, the number of games played on the game (or since factory reset) could be divided by 2500 to determine a new game damping adjustment factor. This alternative is illustrated in FIG. 3C. The difference between the old replay value and the indicated score would be multiplied by the new game adjustment factor to determine the maximum shift allowed in the replay value. For example, if the number of games played on the machine was 500, the maximum shift allowed would be 20% of the difference between the old replay value and the indicated score (500÷2500=0.20).

A still further aspect of this invention relates to replay boosting. Replay boosting refers to a temporary boost in the score to beat after the player wins a free game by beating the current score to beat. As typically done in the industry, when a player exceeds the score to beat and wins a free game, the score to beat is temporarily boosted some fixed amount, such as 10 million or 25 million. If the player beats the boosted score, a further boost of the same amount occurs. This temporary boost only exists for free games. When the player is no longer playing free games, the score to beat reverts to the replay value. One problem with this system is that, since the replay boost is always a set level, it does not take into account the quantity by which the score to beat was exceeded. According to this invention, boosts caused by consecutively exceeding the score to beat would be greater than the normal boost and, if the player's score exceeded the score to beat by at least doubling it, the replay boost would be greater than the normal.

For example, the replay boost for consecutively won games on a game on which the base replay boost was 10% and the replay value was 100 million points would work as follows. Upon winning the first free game, the score to beat would go up 10% to 110 million points. Upon winning a second consecutive free game, the score to beat would be boosted by 30% (10%+20%) to 130 million points. Upon winning a third consecutive free game, the score to beat would be boosted 60% (10%+20%+30%) to 160 million points. Upon winning a fourth consecutive free game, the score to beat would be boosted 100% (10%+20%+30%+

40%) to 200 million. This boost on consecutive won free games would continue to increase according to the formula:

$$STB=RV+10\%RV+((x-1)\times 10\%RV)$$

where

STB=score to beat;

RV=replay value; and x=number of consecutive free games won.

With regard to providing an immediate greater boost for the case where a player exceeds the current score to beat, similar adjustments are made. When the player's score is at least double the score to beat, the replay boost is increased in a step wise fashion. For example, if the score to beat was 100 million points and the player's score was between 200 million points and 300 million points, the replay boost would be by two (200/100) factors (10%+20%) or 30% and the new score to beat would be 130 million. If the player's score was between 300 million points and 400 million points, the replay boost would be by three (300/100) factors (10%+20%+30%) or 60% and the new score to beat would be 160 million points. If the player's score was between 400 million points and 500 million points, the replay boost would be by four (400/100) factors (10%+20%+30%+40%) or 100% and the new score to beat would be 200 million points. This boost for games where the player's score exceeds the score to beat would continue to increase according to this scheme for relatively higher player's scores.

Another aspect of this invention involves adjusting the replay value or providing a replay boost based upon the history of making a playfield feature. For example, if a certain switch relating to a relatively high point scoring playfield feature (such as a "Jackpot") had not been closed for a number of games (for example, at least, 25) either because the switch was broken or players had simply been unable to make this playfield feature, the normal operation of the percentaging system as described herein would work to adjust the replay value downward. If, however, because the switch had been repaired or for some other reason, the switch was being closed and the points associated with the playfield feature were collected, the replay value would be immediately adjusted upwards to either the factory reset level, the level prior to the last time the switch was closed, or by the number of points associated with the feature or by some multiple thereof or some fixed value. Indeed, in an alternative, the system could operate such that it maintains two or more separate records of score data. One record for data representing the scores achieved by players in games in which some major feature was not made and one or more records for data representing the scores achieved in games in which some major feature was made.

Although certain illustrative embodiments of the invention have been shown and described, it is to be understood that various modifications and substitutions may be made by those skilled in the art without departing from the novel spirit and scope of the present invention.

What is claimed is:

1. A method for maintaining a predetermined percentage of free games in a microprocessor controlled pinball game comprising:

storing in memory a desired percentage of free games;

storing in memory data representing the scores achieved by players;

storing in memory a replay value;

awarding a free game when the score exceeds a replay value;

storing in memory a count of the number of games played since the last replay value adjustment;

adjusting said replay level after a predetermined number of games have been played to the average of the two scores chosen from a list of scores sorted from the highest to lowest whose place in the list is closest to an index number determined by multiplying said desired percentage by said number of games; and zeroing said count of the number of games played since the last replay value adjustment.

2. The method of claim 1 wherein said data representing the scores achieved by players stored in memory is for a predetermined number of said scores and is maintained by removing the oldest data from said memory at completion of a game and storing new data representing the score from the most recently completed game.

3. The method of claim 1 further comprising storing in memory a number of games played on said machine; storing in memory a predetermined number of games; and reducing the amount that the replay level is adjusted downward until said predetermined number of games is played.

4. The method of claim 1 further comprising increasing said replay value for one or more games after a game in which a free game is awarded.

5. The method of claim 4 wherein the replay value is increased to approximately the highest score achieved in said game in which a free games is awarded.

6. The method of claim 4 further comprising increasing said replay value an additional amount when two or more consecutive games are played in which free games are awarded.

7. The method of claim 1 further comprising increasing said replay value after a game in which a selected playfield feature is achieved.

* * * * *